US008318866B2

(12) United States Patent
Kurz et al.

(10) Patent No.: US 8,318,866 B2
(45) Date of Patent: Nov. 27, 2012

(54) POLYOXYMETHYLENE MOLDING MATERIALS AND MOLDINGS AND THE USE THEREOF

(75) Inventors: Klaus Kurz, Kelsterbach (DE); Christine Koestler, Hattersheim (DE); Lowell Larson, Independence, KY (US)

(73) Assignee: Ticona GmbH, Kelsterbach (DE)

( * ) Notice: Subject to any disclaimer, the term of this patent is extended or adjusted under 35 U.S.C. 154(b) by 54 days.

(21) Appl. No.: 12/423,671

(22) Filed: Apr. 14, 2009

(65) Prior Publication Data
US 2009/0264583 A1 Oct. 22, 2009

Related U.S. Application Data

(60) Provisional application No. 61/045,322, filed on Apr. 16, 2008.

(30) Foreign Application Priority Data

Apr. 16, 2008 (DE) .......................... 10 2008 018 968

(51) Int. Cl.
*C08L 61/02* (2006.01)
(52) U.S. Cl. ........ 525/399; 525/398; 525/400; 525/402; 525/405; 525/456
(58) Field of Classification Search .................. 525/441, 525/443, 456, 472, 398, 399, 400, 402, 405, 525/410
See application file for complete search history.

(56) References Cited

U.S. PATENT DOCUMENTS

| 3,161,616 | A | 12/1964 | Brown et al. |
| 3,269,988 | A | 8/1966 | Braude et al. |
| 3,393,179 | A | 7/1968 | Leverett et al. |
| 3,998,791 | A | 12/1976 | Radici et al. |
| 4,097,453 | A | 6/1978 | Radici et al. |
| 4,431,794 | A | 2/1984 | Sadlowski et al. |
| 4,493,751 | A | 1/1985 | Cherdron et al. |
| 4,517,319 | A | 5/1985 | Reske et al. |
| 4,780,498 | A | 10/1988 | Goerrissen et al. |
| 5,039,741 | A | 8/1991 | Burg et al. |
| 5,144,005 | A | 9/1992 | Sextro et al. |
| 5,183,860 | A * | 2/1993 | Kashihara ..................... 525/398 |
| 5,541,284 | A | 7/1996 | Arnoldi et al. |
| 5,959,036 | A | 9/1999 | Yahiro et al. |
| 6,388,049 | B1 | 5/2002 | Yokoyama et al. |
| 6,506,850 | B1 * | 1/2003 | Tanimura et al. ............. 525/398 |
| 7,745,548 | B2 | 6/2010 | Zierer et al. |
| 7,915,350 | B2 | 3/2011 | Schmalz et al. |
| 2006/0235119 | A1 * | 10/2006 | Schmalz et al. .............. 524/196 |
| 2007/0202332 | A1 * | 8/2007 | Gunnewig et al. ............ 428/402 |
| 2008/0214748 | A1 * | 9/2008 | Assmann et al. ............. 526/68 |

FOREIGN PATENT DOCUMENTS

| DE | 1 158 709 | | 12/1963 |
| DE | 1 445 255 | | 11/1968 |
| DE | 2 263 300 | A1 | 7/1974 |
| DE | 2947490 | A | 6/1981 |
| DE | 31 47 309 | A1 | 6/1983 |
| DE | 37 03 790 | A1 | 8/1988 |
| DE | 44 36 107 | A1 | 4/1996 |
| DE | 195 81 345 | C2 | 12/1996 |
| EP | 0 080 656 | A | 6/1983 |
| EP | 0 108 324 | A | 5/1984 |
| EP | 0 115846 | A2 | 8/1984 |
| EP | 0 156285 | A2 | 10/1985 |
| EP | 0276080 | | 7/1988 |
| EP | 0342344 | | 4/1989 |
| EP | 0 397492 | A2 | 11/1990 |
| EP | 0 397494 | A2 | 11/1990 |
| EP | 0 397793 | A2 | 11/1990 |
| EP | 0 398585 | A2 | 11/1990 |
| EP | 0 400827 | A2 | 12/1990 |
| EP | 0511412 | | 4/1991 |
| EP | 0 504 405 | A1 | 9/1992 |
| EP | 0565304 | | 4/1993 |
| EP | 0654501 | | 11/1994 |
| EP | 0 673955 | A2 | 9/1995 |
| EP | 0 716 105 | A2 | 6/1996 |
| EP | 0 999224 | A | 5/2000 |
| GB | 1 524 440 | A | 9/1978 |
| GB | 1524410 | A | 9/1978 |
| JP | 4/114003 | A | 4/1992 |
| JP | 4/145114 | | 5/1992 |
| JP | 5/59255 | A | 3/1993 |
| JP | 2003-147161 | * | 5/2003 |
| JP | 2004-204051 | * | 7/2004 |
| WO | 03/050187 | | 6/2003 |

(Continued)

OTHER PUBLICATIONS

Mehrabzadeh, M.; Rezaie, D.; Journal of Applied Polymer Science, 2002, p. 2573-2582.*
Product Data Sheet for Lucel grades N109-02, N109-LD, N109-WR, 1 page.*
Penczek, et al., Cationic Ring-Opening Polymerization, p. 122—published 1980.
International Search Report for PCT/EP2009/002712 Dated Aug. 3, 2009.
International Search Report for PCT/EP2009/002713 Dated Aug. 3, 2009.
Braun at al., "Influences of structural parameters on the dynamic mechanical properties of polyacetals", *Die Arrgewandte Makromolekulare Chemie 228* (1995), pp. 185-200.
Grohn, et al., "Ueber Den Zusammenhang Zwischen Der Molekulargewichtsverteilung Und Den Mechanischen Eigenschaften Von Polyoxymethylendiazetaten", Plaste Und Kautschuk, Leipzig, DE, Bd. 14, Nr. 11, Jan. 1, 1967, Seiten 795-797.
Ishida, "Polymerization of Formaldehyde and the Physical Properties of the Polymerization Products, I", *Journal of Applied Polymer Science*, vol. 26, pp. 2743-2750 (1981).
International Search Report for PCT/EP2009/002714.

(Continued)

*Primary Examiner* — David W Wu
*Assistant Examiner* — Robert Jones, Jr.
(74) *Attorney, Agent, or Firm* — Dority & Manning, P.A.

(57) ABSTRACT

Molding materials and the moldings produced therefrom, containing a) polyoxymethylene in which at least 50% of the terminal groups are hydroxyl groups, which has a melt volume rate MVR of less than 20 $cm^3/10$ minutes, measured according to ISO 1133 at 190° C. and 2.16 kg, and whose proportion of low molecular weight constituents having low molecular weights below 10 000 dalton is less than 15% by weight, based on the total mass of the polyoxymethylene, and b) a thermoplastic elastomer, are described.
The moldings produced from these molding materials are distinguished by a very high notch impact strength.

18 Claims, No Drawings

FOREIGN PATENT DOCUMENTS

| | | |
|---|---|---|
| WO | 2005/023898 | 3/2005 |
| WO | WO 2006/089915 A1 | 8/2006 |
| WO | WO 2006/097486 * | 9/2006 |
| WO | WO 2006/105918 A1 | 10/2006 |
| WO | WO 2007/073874 A1 | 7/2007 |

* cited by examiner

POLYOXYMETHYLENE MOLDING MATERIALS AND MOLDINGS AND THE USE THEREOF

RELATED APPLICATIONS

The present application is based on and claims priority to U.S. Provisional Patent Application No. 61/045,322, filed on Apr. 16, 2008 and claims priority to or the benefit of German Patent Application No. 102008018968.43, filed on Apr. 16, 2008.

The present invention relates to novel polyoxymethylene molding materials, moldings produced therefrom and the use thereof, in particular as molding material for injection molding, blow molding and extrusion for the production of moldings of any type.

Polyoxymethylene (also referred to below as "POM") is a high-performance polymer having good mechanical properties, such as rigidity and strength. However, owing to its high polarity and crystallinity, POM is frequently incompatible or only partly compatible with other polymers. Furthermore, it is possible only in exceptional cases to incorporate functional comonomers into POM.

There have already been attempts to prepare graft polymers and to use functionalized POM thereby.

Thus, EP-A-397,492, EP-A-398,585 and EP-A-397,494 describe functionalized polyoxymethylenes which are prepared by copolymerization of trioxane and the formal of trimethylolpropane (ester), of trioxane and the $\alpha,\alpha$- and $\alpha,\beta$-isomers of glyceryl formal (ester) or of trioxane and the formal of 1,2,6-hexanetriol (ester).

EP-A-400,827 discloses graft polymers which are derived from functionalized POM and polymers functionalized with amino groups. Functionalized POM has acrylate or acrylate ester groups and the polymer functionalized with amino groups is bonded to the functionalized POM by Michael addition. These graft polymers are proposed, inter alia, for use as phase mediators between POM and polymers which resemble the polymer functionalized with amino groups. A disadvantage of these approaches is that the reaction is possible only in solution.

EP-A-397,493 discloses graft polymers which are derived from POM functionalized with hydroxyl groups, diisocyanates and polymer functionalized with hydroxyl, amino or carboxyl groups. The latter are bonded to the functionalized POM by diisocyanate coupling. These graft polymers are proposed, inter alia, for use as phase mediators between POM and other suitable polymers. The document does not give any indications of reactive extrusion with in situ preparation of phase mediator of coupling or impact modifiers to functionalized POM.

It has also already long been known that the impact strength of POM can be influenced by the use of impact modifiers. Examples of these are thermoplastic polyurethane elastomers (also called "TPE-U" below), methyl methacrylate/butadiene/styrene core-shell elastomers, methyl methacrylate/acrylate core-shell elastomers, polycarbonate, styrene/acrylonitrile copolymers or acrylate/styrene/acrylonitrile copolymer compounds. Impact-modified POM molding materials containing such additives are disclosed, for example, in EP-A-115,846 and EP-A-156,285.

WO-A-2006/105,918 describes compositions containing polyoxy-methylenes, thermoplastic elastomer having active hydrogen atoms, further polyoxymethylene containing active hydrogen atoms and a reagent for covalent coupling of the last-mentioned components. These impact-modified POM compositions are distinguished by an improved combination of toughness, elongation at break and joint line strength.

Starting from this prior art, it is an object of the present invention to provide impact-modified POM compositions that are distinguished by an extremely high notched impact strength.

It has now surprisingly been found that molding materials which can be processed to give moldings having extremely high notched impact strengths of more than 100 kJ/m$^2$ can be obtained by using the components defined below. Conventional moldings of unmodified POM compositions typically have notched impact strengths of from about 10 to 15 kJ/m$^2$. The experiments have shown that the content of low molecular weight constituents in impact-modified POM and the viscosity thereof in the molding material have a considerable influence on the notched impact strength to be achieved.

The invention relates to molding materials containing
a) polyoxymethylene in which at least 50% of the terminal groups are hydroxyl groups, which has a melt volume rate MVR of less than 20 cm$^3$/10 minutes, measured according to ISO 1133 at 190° C. and 2.16 kg, and the proportion thereof of low molecular weight constituents having molecular weights below 10 000 dalton is less than 15% by weight, based on the total mass of the polyoxymethylene, and
b) thermoplastic elastomer.

Component a) of the molding material according to the invention is a polyoxymethylene homo- or copolymer which has a high content of terminal hydroxyl groups and contains no low molecular weight constituents or only a small proportion thereof.

The polyoxymethylene of component a) has terminal hydroxyl groups, for example hydroxyethylene groups, and/or polyoxymethylene has hydroxyl side groups.

The content of terminal hydroxyl groups and/or hydroxyl side groups (also referred to together as "terminal hydroxyl groups") is typically at least 50%, based on all terminal groups, preferably at least 70%. In the context of this description, the term "all terminal groups" is to be understood as meaning all terminal and—if present—all side terminal groups.

In addition to the terminal hydroxyl groups, the POM of component a) may also have other terminal groups usual for these polymers. Examples of these are alkoxy groups, formate groups, acetate groups or aldehyde groups.

The polyoxymethylenes of component a) are homo- or copolymers having repeating structural units of the formula —O—CH$_2$— which are functionalized with terminal hydroxyl groups and/or hydroxyl side groups. These POM types may be derived by OH functionalization from POM type which are described further below as POM of optional component d).

The POM polymers of component a) generally have a melt volume rate MVR of less than 20 cm$^3$/10 minutes, preferably of less than 10 cm$^3$/10 minutes, in particular from 0.5 to 5 cm$^3$/10 minutes and very particularly preferably from 0.2 to 1.9 cm$^3$/10 minutes (measured in each case at 190° C. and 2.16 kg load according to ISO 1133). They are therefore comparatively highly viscous polymers.

A substantial feature of the POM types used as component a) is their low content of a proportion of low molecular weight constituents, low molecular weight constituents being polymers having molecular weights below 10 000 dalton.

The proportion of these low molecular weight constituents is at most up to 15% by weight, based on the total mass of the component a), preferably from 0 to 10% by weight and particularly preferably from 0 to 5% by weight.

The preparation of the POM of component a) can be carried out by polymerization of polyoxymethylene-forming monomers, such as trioxane or a mixture of trioxane and dioxane, in the presence of ethylene glycol as a molecular weight regulator. The polymerization can be effected as precipitation polymerization or in particular in the melt. Initiators which may be used are the compounds known per se, such as trifluoromethanesulfonic acid, these preferably being added as solution in ethylene glycol to the monomer. The procedure and termination of the polymerization and working-up of the product obtained can be effected according to processes known per se. By a suitable choice of the polymerization parameters, such as duration of polymerization or amount of molecular weight regulator, the molecular weight and hence the MVR value of the resulting polymer can be adjusted. The criteria for choice in this respect are known to the person skilled in the art.

The above-described procedure for the polymerization leads as a rule to polymers having comparatively small proportions of low molecular weight constituents.

If a further reduction in the content of low molecular weight constituents were to be desired or required, this can be effected by separating off the low molecular weight fractions of the polymer after the deactivation and the degradation of the unstable fractions after treatment with a basic protic solvent.

This may be a fractional precipitation from a solution of the stabilized polymer, polymer fractions of different molecular weight distribution being obtained.

The compositions according to the invention contain, as component b), thermoplastic elastomers which preferably have active hydrogen atoms.

These are to be understood as meaning those thermoplastic elastomers which are capable of forming covalent bonds to the hydroxyl groups of component a) and a coupling reagent optionally used as component c) under the chosen processing conditions.

Examples of thermoplastic elastomers are polyester elastomers (TPE-E), thermoplastic polyamide elastomers (TPE-A) and in particular thermoplastic polyurethane elastomers (TPE-U). These thermoplastic elastomers have active hydrogen atoms which can be reacted with the coupling reagents c). Examples of such groups are urethane groups, amido groups, amino groups or hydroxyl groups, for example of terminal polyester diol flexible segments of thermoplastic polyurethane elastomers which have hydrogen atoms which can react, for example, with isocyanate groups.

Particularly preferably used component b) are thermoplastic polyester elastomers (TPE-E), thermoplastic polyamide elastomers (TPE-A), thermoplastic polyurethane elastomers (TPU-U) or a combination of a plurality of these thermoplastic elastomers.

The presence of a coupling reagent c) is not essential but is preferred since the notched impact strength of the molding can be further increased thereby.

For the formation of bridging groups between the components a) and b), it is possible to use a very wide range of polyfunctional, preferably trifunctional or in particular bifunctional, coupling reagents c) which are capable of forming covalent bonds firstly with hydroxyl groups of component a) and secondly with the active hydrogen atoms of component b).

Component c) is preferably a diisocyanate, preferably an aliphatic, cycloaliphatic and/or aromatic diisocyanate.

Component c) may also be used in the form of oligmers, preferably trimers or in particular dimers, if appropriate as a mixture together with a polymer.

Examples of diisocyanates are aromatic diisocyanates, such as toluene diisocyanate, naphthalene diisocyanates, diphenylmethane 2,4'-diisocyanate or 4,4'-diisocyanatodiphenylmethane; or (cyclo)aliphatic diisocyanates, such as hexamethylenediisocyanate or isophorone diisocyanate.

In addition to the components a), b) and optionally c), molding materials according to the invention can optionally also contain conventional oxymethylene homopolymers and/or oxymethylene copolymers as component d). These differ from the POM types of component a) which contain active hydrogen atoms.

The polyoxymethylenes, as described, for example in DE-A-29 47 490, are generally unbranched linear polymers which contain as a rule at least 80%, preferably at least 90%, oxymethylene units (—$CH_2$—O—). The term polyoxymethylenes comprises both homopolymers of formaldehyde or its cyclic oligomers, such as trioxane or tetroxane, and corresponding copolymers.

Such POM homo- or copolymers are known per se to the person skilled in the art and are described in the literature.

The molding materials or moldings according to the invention can optionally be stabilized and/or modified by known additives. Such stabilizers and processing auxiliaries used as optional component e) are known to the person skilled in the art.

The stabilizers are, for example, antioxidants, acid scavengers, formaldehyde scavengers, UV stabilizers or heat stabilizers. In addition, the molding material or the molding may contain processing auxiliaries, for example adhesion promoters, lubricants, nucleating agents, demolding agents, fillers, reinforcing materials or antistatic agents and additives which impart a desired property to the molding material or to the molding, such as dyes and/or pigments and/or further impact modifiers and/or additives imparting electrical conductivity; and mixtures of these additives, but without limiting the scope to said examples.

The amount of component a) in the molding materials or moldings according to the invention is at least 30% by weight, preferably from 30 to 95% by weight.

The amount of component b) in the molding materials or moldings according to the invention is at least 5% by weight, preferably from 5 to 50% by weight, in particular from 15 to 40% by weight.

The amount of component c) in the molding materials or moldings according to the invention is from 0 to 10% by weight, preferably from 0 to 5% by weight, in particular from 0.1 to 2% by weight.

The amount of component d) in the molding materials or moldings according to the invention is from 0 to 65% by weight, preferably from 0 to 50% by weight.

The amount of component e) in the molding materials or moldings according to the invention is from 0 to 10% by weight, preferably from 0 to 5% by weight.

The stated amounts for the components a) to e) are based on the total mass of the molding material or of the molding.

The molding materials according to the invention can be prepared by mixing the components a) and b) and the optionally present components c), d) and/or e).

The reaction of the reactive components a), b) and c) can be effected separately from the addition of the optional components d) and/or e). The preparation of the reaction product of components a), b) and c) can also be effected in a plurality of steps, for example by reaction of components a) and c) followed by the reaction of the reaction product with component b).

Preferably, all components of the composition are mixed with one another and then reacted in the melt, for example in an extruder.

The reaction of the components is typically effected at temperatures of from 100 to 240° C., preferably from 150 to 220° C., and the duration of reaction is typically from 0.5 to 60 minutes.

The proportion of coupling reagent c) can be chosen within wide limits. Preferably, coupling reagent is used in an amount such that there are from 0.2 to 2.0 mol, preferably from 0.5 to 2.0 mol, of the polyfunctional coupling reagent per mole of active hydrogen atoms, for example in the form of hydroxyl groups, of the polyoxymethylene containing active hydrogen atoms.

The further processing of the molding materials according to the invention can be effected by mixing the finely divided, for example pulverulent or granulated, components and subsequent thermoplastic processing or by mixing the components in heatable mixing units suitable for this purpose. Suitable mixing units and mixing processes are described, for example, in: Saechtling, Kunststoff-Taschenbuch [Plastics Handbook], Hanser Verlag, 27th edition 1998, on pages 202 to 217, which is hereby incorporated by reference.

The molding materials according to the invention can be used for shaped articles of any type, in particular shaped articles which are used in the automotive industry.

These may be, for example, shaped articles for use in the interior of automobiles, preferably clips for fixing cable harnesses, fixing holders or rails for fixing interior components, such as air bags, and loudspeaker grilles, belt release buttons or caps.

They can also be shaped articles for use on the exterior of automobiles, preferably antenna sockets or windscreen wiper caps.

The molding materials according to the invention can be processed by any desired molding processes, preferably by injection molding.

The invention also relates to the use of the molding materials for the abovementioned purposes.

The following examples explain the invention without limiting it. Stated amounts are always in parts by weight, unless stated otherwise.

General Preparation Method for a Polyoxymethylene Terminated by Terminal Hydroxyl Groups Trioxane and dioxolane were mixed via separate metering pumps in the desired mixing ratio in a monomer line. The initiator used was trifluoromethanesulfonic acid, which was dissolved in ethylene glycol and metered into the monomer mixture. In addition, ethylene glycol was metered as a molecular weight regulator into the monomer stream in order to establish the desired MVR. Monomer stream and initiator stream were mixed at the reactor entrance in a premixing zone and, after the equilibrium conversion was reached, the reaction was quenched with triethylamine. Thereafter, the unstable chain ends were degraded in a hydrolysis zone. After discharge from the reactor, the product was substantially freed from the residual monomers in a vented extruder. This was followed by a countercurrent extraction and drying of the polymer obtained.

The following components were used in investigations carried out:

POM-0: MVR 7.0 cm$^3$/10 minutes; proportion of components having a low molecular weight: 4-5% by weight; proportion of terminal OH groups: 6-8 mmol/kg POM-1: MVR 2.0 cm$^3$/10 minutes; proportion of components having a low molecular weight: 0% by weight; proportion of terminal OH groups: 20-25 mmol/kg POM-2: MVR 8.0 cm$^3$/10 minutes; proportion of components having a low molecular weight: 0% by weight; proportion of terminal OH groups: 20-25 mmol/kg POM-3: MVR 9.6 cm$^3$/10 minutes; proportion of components having a low molecular weight: 8-9% by weight; proportion of terminal OH groups: 25-30 mmol/kg TPE-U: Thermoplastic polyurethane granules, hardness 80-85 Shore A (DIN 53505), MFR 30-80 g/10 min at 210° C., 10 kg (ISO 1133)

Coupling agent A: Toluene diisocyanate dimer (TDI dimer), 20-30% strength by weight concentrate Coupling agent B: Methylenediphenyl 4,4'-diisocyanate (MDI); 18-25% strength by weight concentrate Coupling agent C: Methylenediphenyl 4,4'-diisocyanate (MDI); 12-20% strength by weight concentrate Coupling agent D: Methylenediphenyl 4,4'-diisocyanate (MDI); 97-99% by weight All components were first dried at about 70° C. in a vacuum oven from Binder and then mixed in a mixer from Dirk und Sohne (model Diosna R 10 A). For the compounding, an extruder from Berstorff (model ZE 25) was used (zone temperature 190° C., melt temperature about 210° C.). The screw configuration with kneading elements was chosen so that effective thorough mixing of the components took place during the reactive extrusion.

The testing of the prepared compounds was effected according to the following standards:

MVR (190° C., 2.16 kg): ISO 1133

Charpy notched impact strength: ISO 179-1/1eA (CNI)

The results are listed in the following table.

| Example No. | Component a)/ proportion (% by weight) | Component b)/ proportion (% by weight) | Component c)/ proportion (% by weight) | MVR 2.16 (cm$^3$/10') | CNI (+23° C.) (kJ/m$^2$) |
|---|---|---|---|---|---|
| 1 (comparison) | POM-0/82 | TPE-U/18 | — | 7.0 | 14.0 |
| 2 (comparison) | POM-0/81.1 | TPE-U/18 | Coupling agent A/1.83 | 5.0 | 17.1 |
| 3 (comparison) | POM-0/80.2 | TPE-U/18 | Coupling agent C/1.8 | 5.1 | 18.3 |
| 4 | POM-2/82 | TPE-U/18 | — | 6.2 | 22.4 |
| 5 | POM-2/78.4 | TPE-U/18 | Coupling agent A/3.66 | 4.8 | 29.6 |
| 6 | POM-2/78.4 | TPE-U/18 | Coupling agent B/3.60 | 1.4 | 31.0 |
| 7 | POM-3/80.3 | TPE-U/18 | Coupling agent A/1.8 | 5.7 | 19.3 |

-continued

| Example No. | Component a)/ proportion (% by weight) | Component b)/ proportion (% by weight) | Component c)/ proportion (% by weight) | MVR 2.16 (cm³/10') | CNI (+23° C.) (kJ/m²) |
|---|---|---|---|---|---|
| 8 | POM-3/80.3 | TPE-U/18 | Coupling agent B/1.8 | 5.3 | 21.4 |
| 9 | POM-3/81.1 | TPE-U/18 | Coupling agent D/0.9 | 1.9 | 29.1 |
| 10 | POM-3/62 | TPE-U/38 | — | 7.6 | 36.8 |
| 11 | POM-3/60.8 | TPE-U/38 | Coupling agent A/1.2 | 5.4 | 71.2 |
| 12 | POM-3/61 | TPE-U/38 | Coupling agent B/1.0 | 6.2 | 48.0 |
| 13 | POM-1/82 | TPE-U/18 | — | 1.7 | 39.9 |
| 14 | POM-1/81.1 | TPE-U/18 | Coupling agent A/0.87 | 1.4 | 50.4 |
| 15 | POM-1/80.8 | TPE-U/18 | Coupling agent A/1.15 | 1.3 | 69.6 |
| 16 | POM-1/80.2 | TPE-U/18 | Coupling agent A/1.8 | 1.0 | 117.9 |
| 17 | POM-1/62 | TPE-U/38 | — | 2.5 | 87.7 |
| 18 | POM-1/60.3 | TPE-U/38 | Coupling agent A/1.74 | 1.2 | 140.9 |

The invention claimed is:

1. A molding material containing
   a) a polyoxymethylene homo- or copolymer having at least 70%, based on the total number of terminal groups, of terminal hydroxyalkylene groups, wherein the polyoxymethylene has been polymerized in the presence of a molecular weight regulator and wherein unstable chain ends of the polyoxymethylene have been degraded by hydrolysis, the polyoxymethylene having a melt volume rate MVR of less than 20 cm³/10 minutes, measured according to ISO 1133 at 190° C. and 2.16 kg, and wherein the proportion of component a) of low molecular weight polymers having molecular weights below 10 000 dalton is less than 15% by weight, based on the total mass of the polyoxymethylene, the polyoxymethylene being present in the molding material an amount of from 30% to 95% by weight;
   b) a thermoplastic elastomer that has active hydrogen atoms; and at least one component
   c) which contains groups for covalent coupling of the components a) and b).

2. The molding material as claimed in claim 1, wherein the polyoxymethylene has a melt volume rate MVR of less than 10 cm³/10 minutes.

3. The molding material as claimed in claim 1, wherein the proportion of the thermoplastic elastomer is from 15 to 50% by weight, based on the molding material.

4. The molding material as claimed in claim 1, wherein the proportion of the polyoxymethylene having a molecular weight below 10 000 dalton is from 0 to 5% by weight, based on the total mass of the polyoxymethylene.

5. The molding material as claimed in claim 1, wherein component c) is a diisocyanate.

6. The molding material as claimed in claim 1, wherein component b) is a thermoplastic polyester elastomer (TPE-E), a thermoplastic polyamide elastomer (TPE-A) and/or a thermoplastic polyurethane elastomer (TPE-U).

7. The molding material as claimed in claim 5, which additionally contains, as component d) an oxymethylene homopolymer and/or oxymethylene copolymer differing from component a).

8. The molding material as claimed in claim 7, which additionally contains stabilizers and processing auxiliaries as component e).

9. The molding material as claimed in claim 8, wherein the amount of component a) is from 30 to 95% by weight, the amount of component b) is from 5 to 50% by weight, the amount of component c) is up to 10% by weight, the amount of component d) is from 0 to 65% by weight and the amount of component e) is from 0 to 10% by weight, the stated amounts being based on the sum of the components a), b), c), d) and e).

10. A shaped article comprising the molding material as claimed in claim 1.

11. The shaped article of claim 10, wherein the shaped article comprises a clip for fixing cable harnesses, a fixing holder, a loudspeaker grill, or a belt release button.

12. The shaped article of claim 10, wherein the shaped article comprises an antenna socket or a windscreen wiper cap.

13. A molding material as defined in claim 1, wherein the polyoxymethylene has a melt volume rate MVR of from 0.5 cm³/10 minutes to 5 cm³/10 minutes.

14. A molding material as defined in claim 1, wherein the polyoxymethylene has a melt volume rate MVR of from 0.5 cm³/10 minutes to 5 cm³/10 minutes.

15. A molding material as defined in claim 1, wherein the molding material has a Charpy notched impact strength of from 29 kJ/m² to 140 kJ/m².

16. A molding material as defined in claim 1, wherein the molding material has a Charpy notched impact strength of greater than 100 kJ/m².

17. A molding material as defined in claim 1, wherein the molding material has a Charpy notched impact strength of from 50 kJ/m² to 140 kJ/m².

18. A molding material as defined in claim 1, wherein the molding material has a Charpy notched impact strength of from 71 kJ/m² to 140 kJ/m².

* * * * *